United States Patent

[11] 3,539,098

| [72] | Inventors | Koiti Ozawa<br>Fujisawa;<br>Hiroshi Abe, Odawara, Japan |
|---|---|---|
| [21] | Appl. No. | 826,896 |
| [22] | Filed | May 22, 1969 |
| [45] | Patented | Nov. 10, 1970 |
| [73] | Assignee | The National Cash Register Company<br>Dayton, Ohio<br>a corporation of Maryland |
| [32] | Priority | Jan. 11, 1969 |
| [33] | | Japan |
| [31] | | 44/2,318 |

[54] SELECTIVELY CONTROLLED ACTUATING MECHANISM
8 Claims, 10 Drawing Figs.

[52] U.S. Cl. .................................................. 235/60.24,
235/2, 235/60
[51] Int. Cl. ...................................................... G06c 27/00
[50] Field of Search .......................................... 235/60.24,
60.35, 60M.T., 60.26, 60 Gen.2, 6

[56] References Cited
UNITED STATES PATENTS

| 1,857,299 | 5/1932 | Fried et al. | 235/60.24 |
| 2,443,652 | 6/1948 | Carey et al. | 235/60.31 |
| 2,450,165 | 9/1948 | Randall et al. | 235/2 |

*Primary Examiner*—Stephen J. Tomsky
*Attorneys*—Louis A. Kline, Wilbert Hawk, Jr. and Richard W. Lavin ABSTRACT: A mechanism to allow the accumulating or totalizer wheels located in a bank of print keys to be used in the accumulating capacity of a cash register or accounting machine. A mechanism operated by control members located on the keyboard of a cash register or accounting machine for selectively positioning a cam member so as to vary the timing of the movement of the differential mechanism in each of the banks of the print keys to their home position.

INVENTORS
KOITI OZAWA
HIROSHI ABE

BY *Louis A. Kline*
*Wilbert Hawk, Jr.*
*Michael W. Lavin*

THEIR ATTORNEYS

Patented Nov. 10, 1970

INVENTORS
KOITI OZAWA
HIROSHI ABE

BY

THEIR ATTORNEYS

INVENTORS
KOITI OZAWA
HIROSHI ABE

THEIR ATTORNEY

SELECTIVELY CONTROLLED ACTUATING MECHANISM

CROSS-REFERENCE TO RELATED PATENT

Totalizer-Engaging Mechanism, U.S. Pat. No. 2,443,652, issued June 22, 1948, on the application of Edward J. Carey and John B. Geers

BACKGROUND OF THE INVENTION

Cash registers and accounting machines have required the use of banks of print keys which function to introduce reference numerals to the printer and indicator mechanism only. The use of print key banks on the keyboard normally reduces the number of amount key banks in the machine that can be utilized, which reduces the accumulating capacity of the machine, due to the interference that the print keys would have with the totalizer wheels in the print key bank.

It is therefore the primary object of this invention to provide a mechanism to allow the accumulating capacity of the machine to include the totalizer wheels of the print key bank.

A further object of this invention is to allow the differential mechanism in a bank of print keys not to function with respect to the totalizer wheels during an add operation and to function during a read or reset operation of the machine.

SUMMARY OF THE INVENTION

A mechanism controlled by members located on the keyboard of the machine for selectively positioning a control cam member to vary the return movement of the differential mechanism of a key bank to its home position.

DESCRIPTION OF THE PREFERRED EMBODIMENT

Figure 2:
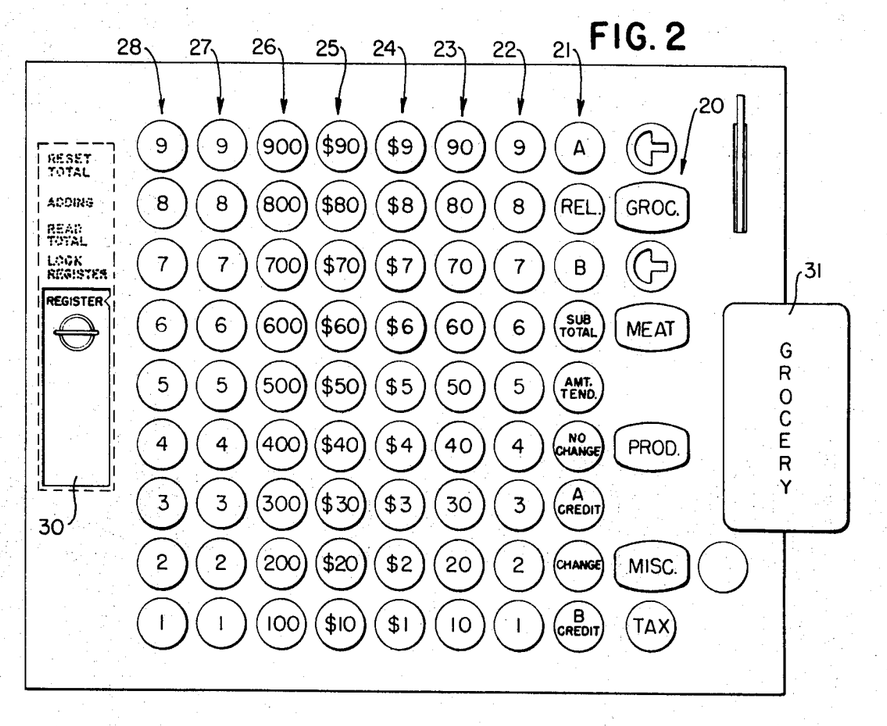
FIG. 2 is a diagrammatic view of the keyboard of the machine embodying the present invention.

Referring now to FIG. 2 of the drawings, there is shown the keyboard of a typical cash register that may be utilized in the present invention. Included in the keyboard are two rows of transaction keys 20, 21, for controlling the position of the corresponding printing wheels to record the type of transaction being performed, and also controlling the engagement and disengagement of the totalizer wheels with and from the differential actuators in each of the amount key banks; five rows of amount keys, 22 to 26 inclusive; and two rows of print keys, 27 and 28, for controlling the printing of identifying numbers. The keyboard also includes a control slide 30, for controlling the function of the machine, and a motor bar 31, for initiating a machine operation. Normally, with five amount banks of keys, the maximum registering capacity of the machine would be $999.99, but, with the present invention, the capacity is $99,999.99, as will be described more fully hereinafter.

Figure 1:
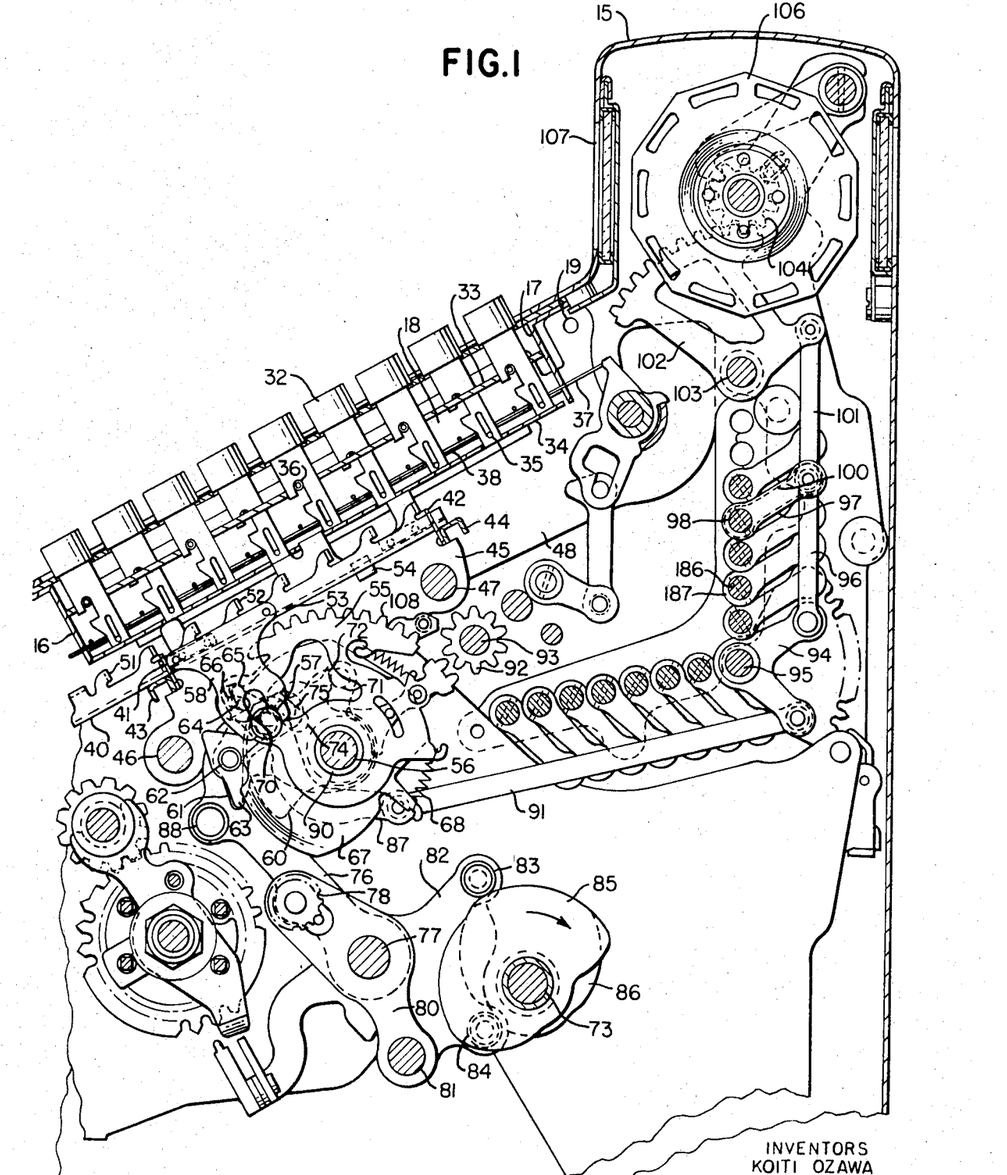
FIG. 1 is a cross-sectional detailed side view of a cash register which is capable of utilizing the present invention, showing an amount key bank and differential mechanism associated therewith, and also showing the indicators and the totalizer or accumulating mechanism actuated by the differential mechanism.

Referring now to FIG. 1, there is shown a detailed side view of one of the amount banks of keys mounted in the machine. This description will be illustrative of the operation of each of the amount key banks and the print key banks found in the keyboard of FIG. 2.

The operating mechanism of the machine is supported by two main side frames 48, one of which is shown in FIG. 1. The mechanism of the machine is enclosed in a suitable cabinet 15. The keys 32 of the key banks 20 to 28 inclusive (FIG. 2) are assembled in a single unit keyboard framework including front and back frame members 16, 17 (FIG. 1); a partition plate 18 for each row of keys; an upper support plate 33; and a lower support plate 34. All of the above plates are secured together by means of tenon-and-slot connections, not shown herein. Small rods 35 pass through holes in the partition plates 18 and slots in the keys 32 to retain the latter in the machine. The keyboard assembly is retained in place in the machine by means of four screws 19, one of which is shown in FIG. 1, which pass through clearance holes in bent-over ears on the front and back frames 16, 17 and are threaded into holes in the main side frames 48. Each of the keys 32 (FIG. 1) of the amount banks 22 to 26 inclusive (FIG. 3) and the print key banks 27, 28 is depressibly supported in slots located in the plates 33 and 34 and is retained against removal by means of slots therein, through which slots extend corresponding ones of the tie rods 35. Each of the amount keys 32 is normally retained in undepressed position by a coil spring 36, which extends horizontally through the entire keyboard assembly, there being one such spring for all keys of like numerical value, each spring being engageable by notches in the keys of like value in all the different banks of keys. The springs 36 rest on the top surface of the upper support plate 33; when a key is depressed, said spring is tensioned by being forced downwardly through an opening in said plate, adjacent to the key stem; and, when said key is released, the spring 36 returns the key upwardly to its undepressed position.

Each of the rows of amount keys has a detent 37 (FIG. 1), for locking the keys in the depressed position, and a control plate 38, for releasing the zero stop pawls (not shown), so that the differential mechanism may be moved away from zero position and be arrested by the depressed amount keys. The amount key banks are of "flexible" construction, wherein the depression of a key in the key bank releases a previously depressed key in the same key bank. Reference should be made to U.S. Pat. No. 2,443,652, issued June 22, 1948, to Edward J. Carey and John B. Geers, for a complete disclosure of the cash register mechanism being described.

Each bank of amount keys 22 to 26 inclusive and the print key banks 27 and 28 (FIG. 2) has associated therewith one of a plurality of differential slides 40 (FIG. 1) shiftably supported in a framework comprising front and back members 41 and 42, secured, respectively, to inverted U-shaped bars 43 and 44, in turn secured to partition plates 45 for each order (only one is shown here), said plate in turn being mounted on rods 46 and 47 supported by the main side frames 48. Each differential slide 40 has formed thereon four upward projections having ears 51 bent towards the left, said ears being adapted to operate with the odd-numbered keys, 1, 3, 5, and 7, and said slide likewise has four similar projections having thereon ears 52 bent towards the right and arranged to cooperate with the even-numbered keys, 2, 4, 6, and 8. The stems of the amount keys in each bank are arranged in staggered formation, so that the stems of the odd-numbered keys are arranged towards the left, while the stems of the even-numbered keys are to the right.

Depression of any one of the amount or print keys, except the "9" key, moves its stem into the path of one of the corresponding ears 51 or 52 of the differential slide 40. The rearward movement of the differential slide 40 under the influence of the amount differential mechanism, to be described hereinafter, causes the ear 51 or 52 to engage the lower end of the stem of the depressed amount key to arrest the slide 40 and the corresponding differential mechanism after the differential movement corresponding to the value of the depressed amount or print key. When the "9" key in any amount or print key bank is depressed, the slide 40 travels the full distance rearwardly to the "nine" position, which is determined by a projection 53 (FIG. 1), mounted thereon, coming into contact with a square stud 54 mounted on the left-hand partition plate 45 for that particular denomination.

The slide 40 (FIG. 1) is connected to a corresponding differential mechanism and controls its extent of movement to different positions in accordance with the control exerted by the keys during the rearward movement of the slide. In adding operations, the corresponding wheel of the selected totalizer is engaged with said differential mechanism after the differential mechanism has been differentially positioned, and return movement of the differential mechanism to its home position adjusts said totalizer wheels in accordance with the value of the depressed amount key in a manner well known in the art.

The amount differential mechanism shown in FIG. 1 includes a differentially movable actuator 55 free on a rod 56 and having a stud 57 engaging a slot in an arm 58 secured to the differential slide 40, whereby the actuator can drive the slide 40 in unison therewith and the slide can control the extent of movement of the actuator 55.

During each cycle of operation of the machine, the actuator 55 is driven first clockwise and then counterclockwise by a driving segment 60, also loosely mounted on the rod 56, which driving segment is given its clockwise and counterclockwise movements during each operation of the machine by means to be described hereinafter.

The actuator 55 is connected to the driving segment 60 by means of a latch 61 pivotally mounted on a stud 62 mounted on a latch plate 63, which in turn is mounted on the rod 56. A stud 64 on the latch 61 works in an inclined slot 65 formed in the actuator 55 and also in a slot 66 formed in a latch control plate 67, and provides a means whereby these parts are connected for joint movement. A spring 68 urges the actuator 55 clockwise and the latch control plate 67 counterclockwise, creating a scissors action between the slots 65 and 66 and the stud 64 to retain the latch 61 normally in a clockwise position, as shown in FIG. 1, in which position the latch engages a shoulder 70 on the driving segment 60. As long as the latch 61 remains engaged at the shoulder 70, the driving segment 60, during this clockwise movement, can move the actuator 55, the latch control plate 67, and the differential slide 40.

As explained earlier herein, the differential slide 40 may be arrested under control of the keys in the amount and print key banks after different extents of movement have been imparted to the slide. When the slide 40 is thus arrested, it is effective, through the arms 58 and the stud 57, to arrest further movement of the actuator 55. However, at this time the latch 61 continues to move, and this further movement enables the stud 64 on the latch 61 to coact with the slot 65 in the actuator 55 to cam the latch 61 out of engagement with the shoulder 70 on the driving segment 60 and release the actuator 55 from its driving means. In this manner, the differential slide 40 is effective to control the differential movement of the actuator 55 according to the amount set up on the amount keys.

During the counterclockwise movement of the driving segment 60, a stud 71 thereon engages an extension 72 of the latch plate 63, which extension is shown in dotted lines in FIG. 1, and drives the latch plate 63 and the latch 61 and, through the stud 64, drives the differential actuator 55, the latch control plate 67, and the differential slide 40 back to the normal, or starting, position.

The means for imparting the above-mentioned clockwise and counterclockwise movement to the driving segment 60 during each operation of the machine will now be described.

Under normal operating conditions, a conventional type of electric motor (not shown) drives a main cam shaft 73 one clockwise revolution during each machine operation. The driving segment 60 has therein a slot 74 (FIG. 1), which engages a stud 75 mounted on a differential drive arm 76 free on a rod 77 supported by the side frames 48. An eccentric 78 adjustably connects the arm 76 to a companion arm 80 also free on the rod 77, and said arm 80 and similar arms for the other differential mechanisms are connected together by a rod 81, which is carried by a differential cam lever 82, also free on the rod 77. The cam lever 82 carries rollers 83 and 84, which cooperate, respectively, with the peripheries of companion plate cams 85 and 86 secured to the main shaft 73. The lever 82 is located on the left-hand end of the rod 77 and supports the left-hand end of the rod 81, while a similar cam lever (not shown) is located near the right-hand end of said rod 77 and supports the right-hand end of said rod 81 and carries rollers which cooperate with a pair of companion plate cams (not shown, but similar to the cams 84 and 86), also secured to the main drive shaft 73. The rod 81, therefore, forms an operating connection between the cam levers, as 82, and the arms 80 for the amount differential mechanism and the differential mechanisms associated with the print key banks 27 and 28.

As previously explained, the main drive shaft 73 (FIG. 1) makes one clockwise revolution during each machine operation. When the machine is in the home position, the slide 40 and the actuator 55 have been moved one position beyond zero, as shown here, for the purpose of enabling transfers to be effected, as will be described more fully hereinafter. At the beginning of a machine operation, the cams 85 and 86, as well as the other pair of cams (not shown) corresponding thereto, through the connections shown here, rock the arm 76 and the driving segment 60 a short distance clockwise to move the actuator 55 and the slide 40 from the home position to the zero position, where they remain during a period in which the restoration of any tripped transfer mechanism takes place in a manner well known in the art. After the transfer mechanism has been restored, the cams 85 and 86 impart further clockwise movement to the driving segment 60, which tends to drive the actuator 55 and the differential slide 40 farther. If no amount key in the bank has been depressed, further movement of the slide and the actuator is prevented by a zero stop pawl (not shown), but, if an amount key has been depressed, the slide 40 and the actuator can continue their movement until one of the bent-over ears 51 or 52 on the slide 40 comes into contact with the lower end of the stem of the depressed amount key. This obstructs further rearward movement of the slide 40 and the actuator 55 in accordance with the value of the depressed amount key. Stopping the actuator 55 causes the stud 64 to ride up the inclined surface of the slot 65, against the action of the slot 66 and the spring 68, to disengage the latch 61 from the shoulder 70 of the driving segment 60 in the position corresponding to the amount key 32 which has been depressed. After the latch 61 has been disengaged from the driving segment 60, the segment 60 is free to complete its clockwise movement.

One end of a beam 87 (FIG. 1) is pivotally connected to the latch plate 63, and, when the arm 76 nears the end of its initial clockwise movement, a roller 88, carried thereby, engages an arcuate surface on the forward edge of said beam and forces a curved surface on its inside edge into engagement with the periphery of a hub 90, free on the rod 56, to position said beam 87 in accordance with the value of the depressed amount key 32. The differential position of the beam 87 is transmitted through a link 91 to the indicator mechanism and the printing mechanism in the following manner.

The link 91 is connected to a bell crank 94 (FIG. 1) free on a shaft 95 supported between the side frames. The bell crank 94 is connected by a link 96 to a crank 97 secured to a shaft 98 mounted between the side frames 48 of the machine. Also secured to the shaft 98 is a crank 100 connected by a link 101 to an indicator-positioning segment 102 free on a rod 103 mounted within the framework of the machine. Teeth in the segment 102 mesh with a pinion 104 free on a rod 105 supported within the framework of the machine. The pinion 104 is flexibly connected to a front indicator wheel 106. Numbers on the wheel 106, which correspond to the keys 32, are visible through a glass-covered aperture 107 in the front of the cabinet 15. Thus it will be seen that the positioning of the link 91 by the differential mechanism under the control of a depressed key positions the indicator mechanism to indicate a number corresponding to the depressed key. The rotation of the shaft 98 also results in the positioning of a type wheel (not shown) in the printing mechanism, so that the numerical value of the key depressed will be printed on a record sheet located in the machine. For a complete disclosure of the printing mechanism used in the machine, reference should be made to the previously-cited Carey and Geers U.S. Pat. No. 2,443,652.

Figure 3:
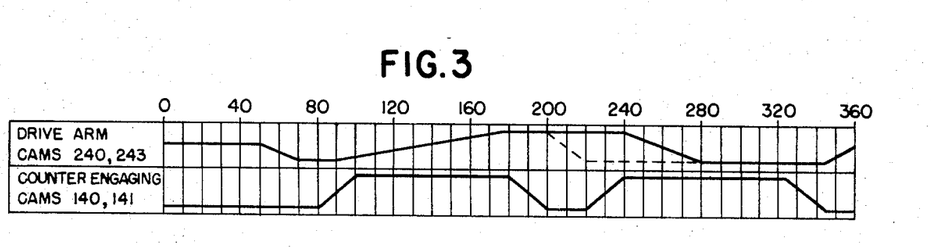
FIG. 3 is a schematic representation of the timing operation of the drive arm and the totalizer-engaging cam member which control the operation of the machine.

After the differential actuator 55 (FIG. 1) has been positioned under the influence of the depressed key 32 during an amount-entering operation, a totalizer wheel 92, freely mounted on a totalizer shaft 93, is moved into engagement with a plurality of gear teeth 108 in said actuator 55. The totalizer wheels 92 include an item totalizer, which functions to accumulate the items of a multiple-item transaction, and a group totalizer, to which the total accumulated in the item totalizer is transferred. Counterclockwise return movement of the differential drive arm 76, under the influence of the cams 85 and 86, turns the driving segment 60 counterclockwise, causing the stud 71 thereon to engage the extension of the latch plate 63 at the same time that the shoulder 70, or undercut portion of the peripheral segment 60, is moved past the latch portion of the latch 61. When the undercut portion of the peripheral segment 60 moves opposite the latch 61, the camming action of the angular slots 65 and 66 in the actuator 55 and the plate 67, under the influence of the spring 68, immediately reengages said latch with the shoulder 70 on the segment 60. The latch plate 63 and the latch 61 are now free to return counterclockwise in unison with the segment 60 and, through the stud 54, carry the latch control plate 67 and the actuator 55 counterclockwise in unison therewith from set position to home position. The counterclockwise return movement of the actuator 55 causes the teeth 108 to rotate the totalizer wheels 92 engaged therewith in a clockwise direction, in accordance with the value of the depressed amount key 32, to add said value in said wheel. After the actuator 55 has been returned to home position, the totalizer wheels are disengaged therefrom. Reference should be made to FIG. 3, which shows the movement of the differential mechanism in terms of rotation of the main cam shaft 73. This FIG. shows the clockwise movement of the segment 60 and the actuator 55 occurring between 90° and 180° of revolution, and the counterclockwise movement to the home position between 240° and 280° of revolution. Also shown is the engagement of the totalizer wheels 92 with the actuator 55, which occurs between 80° and 100° for a read or reset operation and between 220° and 240° for an adding operation.

In total and subtotal recording operations, the selected totalizer wheel 92 is engaged with the teeth 108 before the actuator 55 moves clockwise from its home position. The clockwise movement of the actuator 55 rotates the engaged wheel counterclockwise to a zero position, where the wheel will be effected to prevent further movement of the actuator in a manner well known in the art. After the actuator has completed its clockwise movement, the totalizer wheel is disengaged therefrom. In subtotal recording operations, the totalizer wheel is reengaged with the actuator before it begins its counterclockwise return movement, thereby enabling the amount originally removed from the wheel to be restored. After the actuator has been restored to its home position, the totalizer wheel is disengaged therefrom. The mechanism for engaging and disengaging the wheel with and from the actuator in these different kinds of operations will be described more fully hereinafter.

It will thus be seen that, during an add operation, the indicator and printer mechanisms are affected during the first half of the cam cycle, while the totalizers are affected during the second half of the cycle. In a read or reset operation, the totalizers are affected during both halves of the cycle. If totalizer wheels were located in the printer key banks, the depression of a print key during an add operation, which is the normal procedure of the use of a print key, would affect the totalizer during the second part of the cam shaft cycle in the manner just described, thus destroying any total on the totalizer wheel, since the print keys have no numerical relationship with the amount banks. The present invention allows the print keys to function during the first half of the cam shaft cycle, but they are prevented from affecting the totalizer wheels during the second half of the cycle in an add operation. In a read or reset operation, the print keys are not depressed; thus the totalizers will operate in a normal manner.

Figure 7:
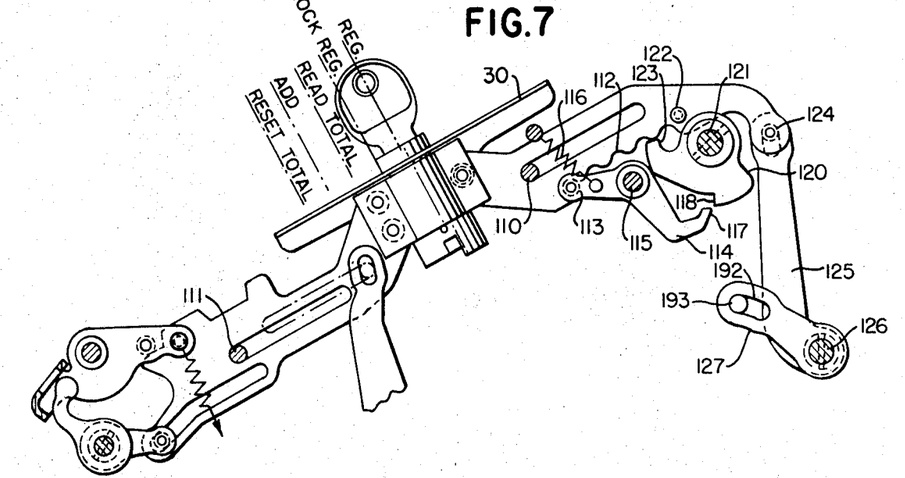
FIG. 7 is a right-side detailed view of the lock control slide for controlling the differential functions of the machine and the sliding cams.

Referring now to FIG. 7, there is shown the manually adjusted control lock slide 30, which is provided for conditioning the machine to perform different machine operations. For example, when the slide is moved to its Register, or add, position, the machine is thereby conditioned to function as a cash register which allows certain types of totals to be entered into the totalizer wheels 92 (FIG. 1) under the control of certain of the keys in the transaction banks 20, 21 in add timing. When the slide 30 is adjusted to either the "Read Total" position or the "Reset Total" position, the group totalizer wheels 92 are operated in read or reset timing to affect the totals contained therein. A description of the operation of the slide 30 will be limited to its function in the control of the present invention. For a full disclosure of the construction and operation of the lock slide 30, reference should be made to the previously cited U.S. Pat. No. 2,443,652.

The control slide 30 is shiftably mounted by means of parallel slots located therein cooperating with studs 110, 111, secured in the side frame 48. The slide 30 has therein a series of notches 112 corresponding to the various positions of adjustment of the slot, which notches cooperate with a stud 113 in a spring-pulled arm 114, free on a stud 115 mounted within the framework of the machine, to locate said slide in the various positions of adjustment. As the stud 113 rides from one notch 112 to another, the arm 114 is rocked counterclockwise, against the tension of a spring 116, to momentarily raise a projecting finger 117 on said arm into the path of a shoulder 118 on an arm 120, secured on the left-hand of a key lock shaft 121, which, when rocked clockwise, releases the machine for operation. This movement of the finger 117 obstructs the clockwise releasing movement of the shaft 121 when the control slide 30 is being moved from one position to another. When the control slide 30 is moved to "Lock Register" position (FIGS. 2 and 7), a stud 122, carried thereby, moves over a projecting finger 123 of the arm 120 to lock the key lock shaft 121 against a releasing movement.

Mounted on the end of the lock slide 30 is a stud 124, on which is mounted an arm 125, the other end of which is secured to a shaft 126, journaled in the framework of the machine. It will be seen from this construction that movement of the lock slide 30 results in the rocking of the shaft 126 a distance commensurate with the movement of the slide 30. Secured to the shaft 126 is an arm 127, which is utilized in the control of the engagement and disengagement of the totalizer wheels 92 FIG. 1) with and from the actuator 55 of each of the amount and print key banks, as will now be described.

The totalizer-engaging mechanism of the instant machine enables the selected totalizer wheels to be engaged with and disengaged from the amount actuators at the proper time in the various types of operations which may be performed by the machine.

Secured to the right-hand end of a shaft 130 (FIGS. 4 and 9) is an arm 131, to which is pivoted the upper end of an actuating link 132. The actuating link 132 has in its lower end an inverted key-shaped slot 133, into which projects a stud 134 carried by a cam lever 135 free on a stud 136 carried by the main side frame 48.

Figure 9:
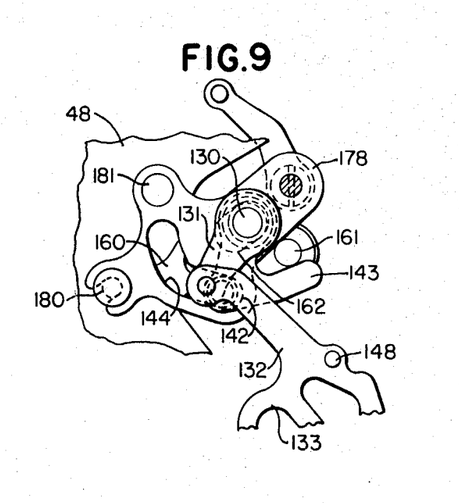
FIG. 9 is a detailed side view of a portion of the mechanism for engaging the totalizer wheels with the amount actuators.

The shaft 130 is part of a shiftable totalizer framework which comprises a pair of support plates 160 (FIG. 9), which support the totalizer shaft 93 (FIG. 1), the engaging shaft 130, and a tie rod 161. The engaging shaft 130 extends through the support plates 160 and is rotatably mounted therein. The support plates 160, in turn, are shiftably mounted in the machine by means of slots thereon (not shown) engaging studs mounted on the side frame 48, and by means of the ends of the shaft 130, which engage, respectively, slots 162 in a pair of totalizer framework support plates 178, which are removably attached to the frame 48 by means of slots in the extensions thereof coacting with studs 180, and by means of screws 181, as shown in FIG. 9, which shows the right-hand plate 178 having therein identical camming slots 144, which cooperate with rollers 142 carried by an arm 143 secured to the shaft 130. When the shaft 130 is rotated clockwise, the rollers 142 travel in the slots 144 and cause the totalizer wheels 92 to be shifted into engagement with the actuator 55 of the amount and print key banks.

The cam lever 135 (FIG. 4) carries rollers 137 and 138, which cooperate, respectively, with the peripheries of companion plate cams 140 and 141 secured to the main cam shaft 73. During each operation of the machine, the cams 140 and 141 are rocked clockwise to cause the lever 135 to make two excursions of movement, each of which excursions consists of a counterclockwise movement from the position shown in FIG. 4 and a return to this position. The lever 135 makes its first counterclockwise movement before the amount and print key actuators 55 (FIG. 1) are moved clockwise from their home positions, and remains in this moved position until these actuators have completed their clockwise movement, after which the lever is returned to its home position. The second counterclockwise movement of the lever 135 occurs before the amount actuators begin their counterclockwise return movement. The lever 135 remains in its moved position until these actuators have been returned to normal position, after which the lever 135 is returned to its home, or normal, position.

Figure 4:
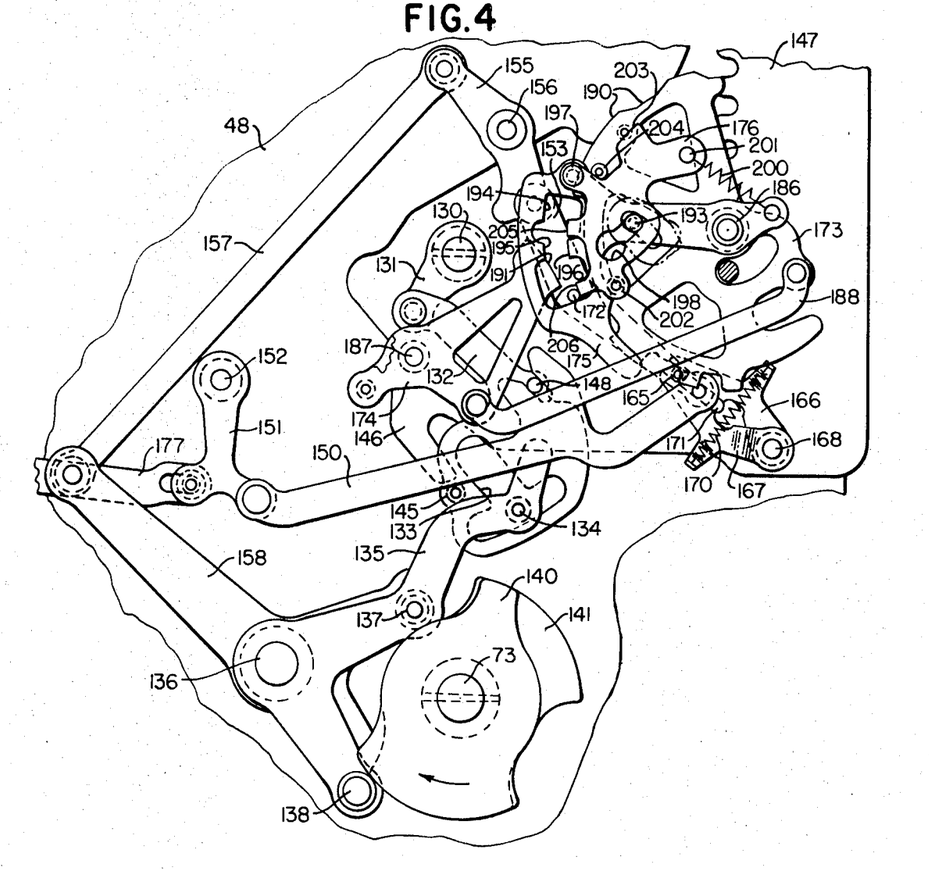
FIG. 4 is a detailed side view of the mechanism for selectively controlling the engaging and disengaging movement of the totalizer elements, and the mechanism for imparting the engaging-disengaging movement to said totalizers.

If the actuating link 132 is in the position shown in FIG. 4, the cam lever 135 does not cause any movement of the actuating link 132, because the stud 134 operates idly in the upwardly-extending portion of the slot 133 in the link 132. When the link 132 has been pivoted either clockwise or counterclockwise to bring the stud 134 into the right-hand or left-hand branch of the slot 133, the counterclockwise movement of the cam lever 135 causes an upward movement of the link 132, which, through the arm 131, causes a clockwise movement of the shaft 130 to cause the rollers 142 on the arm 143 to cooperate with the slots 144 to engage the totalizer wheels 92 with the amount actuator 55 in the manner previously described. Return movement of the cam lever 135 causes the actuating link 132 to be shifted downwardly to its normal position to disengage the totalizers from the actuators. A stud 145 (FIG. 4), carried by the actuating link 132, cooperates with an extension 146 of an auxiliary frame member 147 to prevent an unintentional upward movement of the actuating link 132 when the link is in the position shown in FIG. 4 and to prevent the link from being shifted to disengage the right-hand or left-hand branch of the slot 133 during any upward excursion of the link 132.

Figure 8:
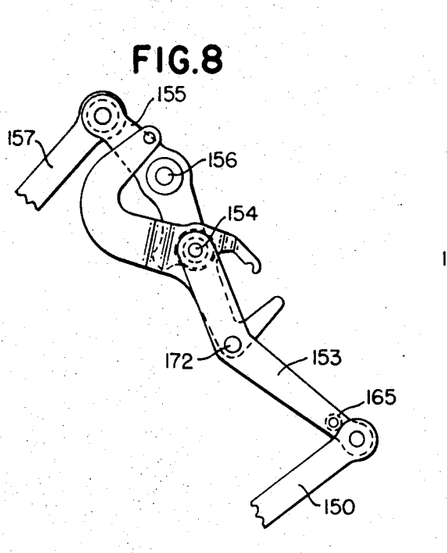
FIG. 8 is a detailed side view of a portion of the totalizer shifting and engaging mechanism shown in FIG. 4.

The actuating link 132 may be pivoted about its connection with the arm 131 to cause the right-hand and left-hand branches of the slot 133 selectively to engage the stud 134 to enable the link 132 to be actuated thereby. This pivotal movement of the link 132 is controlled by the control slide 30 and by the keys in the transaction rows 20, 21 (FIG. 1) according to the type of operation being performed by the machine, in a manner well known in the art. The manner in which the transaction keys in the transaction banks of the keyboard (FIG. 2) and the control slide 30 control the position of the link 132 will now be explained. The actuating link 132 carries a stud 148 (FIG. 4), which cooperates with a slot in a link 150. The link 150 is pivotally supported at its left end by an arm 151 carried on a stud 152 in the frame 48 and is pivotally connected at its right end to a shifting lever 153 (FIGS. 4 and 8), by which it may be shifted and, through the engagement of the stud 148 with the slot in the link 150, cause the actuating link 132 to be pivoted to effect engagement of the right-hand or left-hand branch of the slot 133 in the link 132 with the stud 134 on the cam lever 135.

The upper end of the lever 153 (FIGS. 4 and 8) is pivotally supported by a stud 154 mounted in the lower end of a lever 155, which is free on a stud 156 in the frame 48. A link 157 connects the upper end of the lever 155 to an upper extension of a cam lever 158 free on the stud 136. The lever 158 carries a pair of rollers (not shown), which are similar to the rollers 137 and 138 (FIG. 4) and which engage a pair of cam plates (not shown), secured to the main shaft 73, which cam plates receive one complete clockwise rotation during each operation of the machine. The operation of these cams is similar to the operation of the cams 140 and 141. During the rotation of the cam shaft 73, the cam lever 158 is rocked, and, through the link 157, the lever 155 is rocked first clockwise from the home position before the amount actuator is moved from the home position, then rocked counterclockwise past home position after the amount actuators have completed their clockwise movement, and then finally rocked clockwise to its home position after the amount actuators have been restored to the home position.

A stud 165 (FIGS. 4 and 8), near the lower end of the lever 153, is engaged by a pair of arms 166 and 167, which are pivoted on a stud 168 in the auxiliary frame 147 and urged by a spring 170 into engagement with a stud 171 in the frame 147. The arms 166 and 167 tend to maintain the lower end of the lever 153 in its neutral, or home, position, as shown in FIG. 4.

A stud 172, carried by the lever 153, is adapted to cooperate with high and low control surfaces on a pair of control segments 173, which are set, in a manner to be described hereinafter, according to the transaction keys, and with high and low control portions on a control segment 175 and an auxiliary control member 176, which are set according to the position of the control slide 30. The operation of the lever 153 is as follows: If the stud 172 is not blocked against lateral movement by a high control portion on one of the control segments or the control member, clockwise and counterclockwise movement of the lever 155 will cause the lever 153 to pivot idly about the stud 165, which is yieldingly held in mutual position by the arms 166 and 167.

If the stud 172 is blocked from movement to the left during the initial clockwise movement of the lever 155, the lever 153 rocks counterclockwise about the stud 172 and causes the stud 165 in the lower end of the lever 153 to move to the right against the tension of the spring 170. This movement of the lower end of the lever 153 will, through the link 150, shift the actuating link 132 to engage the left-hand branch of the slot 133 with the stud 134 and enable the link 132 to be operated thereby during the first oscillation of the cam lever 135. The stud 172 is blocked against movement to the left in all total and subtotal operations to cause the engagement of the totalizer with the amount actuators 55 before these actuators move from their home positions, and to cause the totalizer to be disengaged from the actuators after the actuators have completed their clockwise movement.

After the lower end of the lever 153 has been shifted to the right and the lever 155 begins its counterclockwise movement, the arm 166 acts on the stud 165 to move the lower end of the lever 153 back to its normal position.

If the stud 172 is blocked from movement to the right during the counterclockwise movement of the lever 155, the lever 153 rocks clockwise about the stud 172 and causes the stud 165 and the lower end of the lever 153 to move to the left against the tension spring 170. The leftward movement of the lower end of the lever 153 shifts the link 132 and causes the right-hand branch of the slot 133 to engage the stud 134 on the cam lever 135 to enable the link 132 to be operated thereby during the second oscillation of the cam lever 135. The stud 172 is blocked against movement to the right in all adding operations, subtotal operations, and certain total transfer operations to cause a totalizer to be engaged with the actuators after the actuators have completed their clockwise movement, and to be disengaged from the actuators after the actuators have completed their counterclockwise, or return, movement to home position.

During the final clockwise movement of the lever 155, the arm 167 restores the lower end of the lever 153 to normal position, so that, at the end of the operation, the lever 153 occupies its normal, or home, position, as shown in FIG. 4.

The control segments 173, one of which is shown in FIG. 4, are set under the control of certain of the transaction keys in the second transaction bank 21 (FIG. 2), as will be disclosed hereinafter. The operation of the transaction bank of keys is the same as that described with respect to the amount and print key banks (FIG. 1) except that no actuator 55 is included in each of the banks. When a key in one of the transaction banks has been depressed, a bell crank similar to the bell crank 94 (FIG. 1) is rotated by a link similar to the link 91 (FIG. 1) to rock a shaft 186 (FIG. 1) through the action of an arm 187 connected to the bell crank by a link similar to the link 96. The shaft 186 is controlled by the keys in the row 2 transaction bank 21 (FIG. 2). Thus the shaft 186 is rocked a predetermined distance commensurate with the transaction key depressed in the second transaction bank in the same manner that the shaft 98 (FIG. 1) is rocked commensurate with the amount key depressed.

Secured to the shaft 186 is the control segment 173 (FIG. 4) mounted for differential movement therewith under the control of the transaction keys in the second transaction bank, as disclosed above. A second control segment 174 is pivoted on a stud 267 on the extension 146 of the auxiliary frame 147 and is connected by a link 188 to the segment 173, so that, when the segment 173 is differentially moved in either direction, by the shaft 186, the control segment 174 will be given a like extent of movement in the same direction. The control segment 173 contains on its peripheral surface a plurality of selectively positioned high and low control surfaces 190 (FIG. 4), while the control segment 174 contains a blocking surface 191. Thus, depending on the position of the control segments 173 and 174 with respect to the stud 172 (FIG. 4), will the movement of the lever 153 be controlled in the manner previously described.

As disclosed previously with respect to FIG. 7, the arm 127 is rocked a distance commensurate with the movement of the control slide 30. Located in the arm 127 is a slot 192, in which is located a stud 193 (FIGS. 4 and 7). The stud 193 is mounted on the control segment 175, which is free on the shaft 186. Movement of the control slide 30 from the "Register" position to any one of its other positions of adjustment causes the arm 125 (FIG. 7), the shaft 126, and the arm 127 to be rocked counterclockwise, whereupon the control segment 175 is positioned accordingly through the stud 193 (FIGS. 4 and 7) and the slot 192. The control segment 175 has a control portion 194 and opposed projections 195, 196 extending into an opening formed in the segment, which projections, upon the positioning of the segment 175 by the control slide 30, are placed opposite the stud 172 and cooperate with the latter to control the engagement and disengagement of the selected totalizer wheels and the amount actuator in the manner described previously.

Pivotally mounted on a stud 197 secured to the control segment 175 is the auxiliary control member 176, having a slot 198, which is concentric with the stud 197 and in which the stud 193 may operate to allow the auxiliary control 176 to pivot about the stud 197. A spring 200, connected to a stud 201 in the upper end of the auxiliary control member 176 and to an extension of the segment 175, normally urges the member 176 clockwise to maintain a stud 202, carried thereby, in yielding engagement with the edge of the segment 175. The auxiliary control member 176 has, on its upper end, a surface 203, which may be engaged by a stud 204 on the control segment 173 to prevent counterclockwise movement of the auxiliary control member 176 about its pivot stud 197 and thus enable projections 205 and 206 on the auxiliary member 176 to cooperate with the stud 172 in the same manner as the projection 195 on the control segment 175, described previously, to provide additional control over the engaging and disengaging movement of the totalizer. It will thus be seen from this arrangement that the timing of the engagement and disengagement of the totalizers and the actuators 55 of the amount and print key banks is under the control of the lock slide 30 and the transaction keys in the second transaction bank 21. As is well known in the art, the main function of the transaction keys is to shift the totalizer shaft 93 laterally to align selected totalizer elements 92 with the amount actuators 55 (FIG. 1). For a more complete description of the totalizer engaging and disengaging structure and transaction key operation, reference should be made to the previously cited U.S. Pat. No. 2,443,652.

Figure 10:
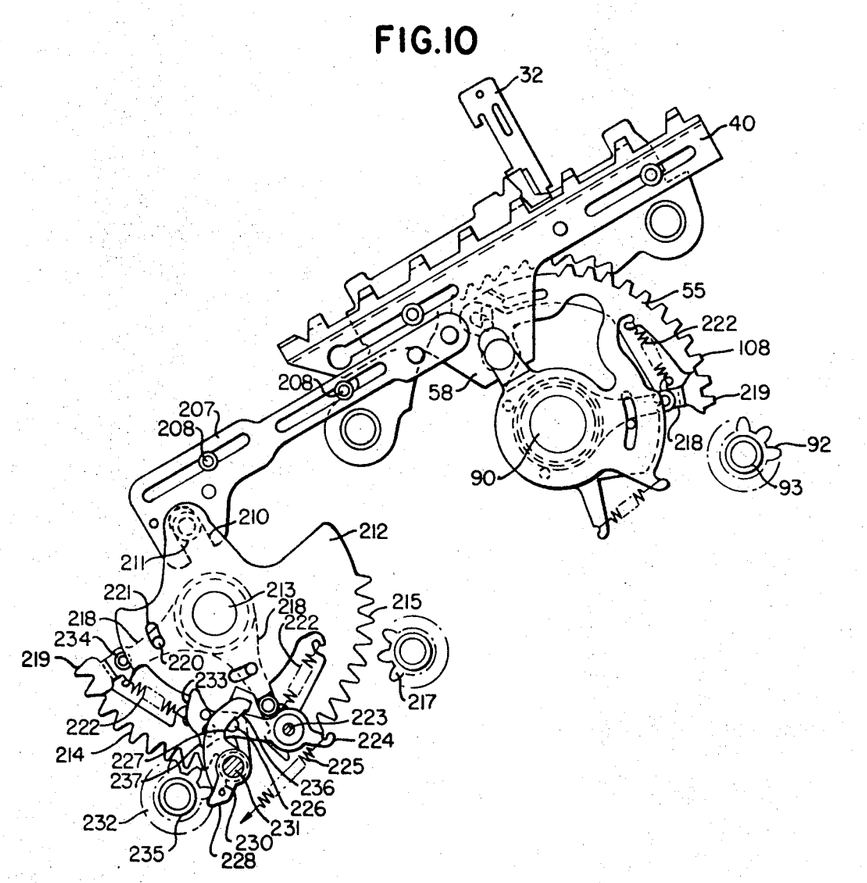
FIG. 10 is a detailed side view of another embodiment of the present invention, which includes three totalizer shafts and the transfer mechanism for transferring amounts between each amount and print key bank.

Referring now to FIG. 10, there is shown a modification of a mechanism disclosed in FIG. 1, in which three totalizer lines are mounted in the machine. Shown secured to the end of the differential slide 40 is a differential detent 207 slidably supported on studs 208 mounted on the frame of the machine. A slot 210 located in the detent 207 yokes a stud 211 mounted on a counter gear 212 rotatively mounted on a shaft 213 supported within the framework of the machine. It will be seen from this construction that, upon movement of the slide 40 by the depression of an amount key 32, both the actuator 55 and the counter gear 212 are rotated commensurate with the movement of the slide 40 to a position representing the key depressed.

Mounted on the periphery of the counter gear 212 are two sets of gear teeth 214 and 215. The gear teeth 214 are associated with the totalizer wheels 216, and the gear teeth 215 are associated with the totalizer wheels 217 in the same manner as previously described with respect to the totalizer wheels 92 and the gear teeth 108 of the actuator 55.

Associated with each of the totalizer lines is a tens transfer mechanism, one of which is shown in FIG. 10. Rotatively mounted on the shaft 213 is a transfer segment 218 containing a tooth portion 219. There is one transfer segment for each amount and print key bank. A stud 220, mounted on the segment 218, is positioned within a slot 221 located in its associated counter gear 212. A spring 222, connected to the counter gear 212, engages the transfer segment 218, normally urging the segment into engagement with the counter gear, which allows the tooth portion 219 to be a continuation of the gear teeth 214 of the counter gear 212.

Rotatably mounted on a shaft 223, secured within the framework of the machine, is a transfer stop arm 224, normally urged clockwise by a spring 225 attached to the machine framework. A stud 226, mounted on the stop arm 224, is engaged by a lower step portion 227 of the transfer pawl 228, which is normally urged clockwise by a spring 230 mounted around a stud 231 mounted in the machine framework. The transfer pawl 228 extends to a position adjacent the totalizer wheels 232 in the next lower denomination amount or print key bank.

As shown in FIG. 10, the transfer mechanism is in the untripped position. When the counter gear 212 is rotated counterclockwise toward its home position, an upper portion of the foot 233 of the stop arm 224 engages a stud 234 mounted on the transfer segment 218, thereby rocking the segment clockwise against the action of the spring 222. This in effect separates the transfer segment 218 from the counter gear 212 as the counter gear passes from zero position to the home position. When an add operation is to occur, the counter gear 212 is rotated clockwise under the control of the slide 40 until the slide is stopped by the key stem of the depressed amount or print key 32 in the manner described previously. As the counter gear 212 passes through the zero position, the foot portion 233 of the stop arm 224 releases the segment 218 to the action of the spring 222, which allows the gear 212 to pick up the segment as shown in FIG. 10.

After the counter gear 212 has been positioned by the depressed key 32, the totalizer wheels 232, mounted on the totalizer shaft 235, are brought into engagement with the gear teeth 214 of the counter gear 212, and the counter gear 212 is then rotated counterclockwise towards its home position by the cam plates 85, 86 (FIG. 1). This movement also rotates the totalizer wheels 232 clockwise to add the numerical value of the depressed key into the totalizer wheels. When the totalizer wheels pass from 9 to 0 in this operation, a wide tooth on the totalizer wheels engages the end of the transfer pawl 228, rocking the pawl clockwise about the stud 231 against the action of the spring 230. This movement allows the spring 225 to rock the stop arm 224 clockwise until the stud 226 on the stop arm engages a bottom step portion of the transfer pawl 228. This movement positions a lower portion 237 of the foot 233 in line with the stud 234 on the transfer segment 218, so that, as a counter gear 212 of the next higher denomination row is rotated past the zero position to its home position, the tooth portion 219 of the transfer segment 218 adds "one" to the totalizer wheels in the next higher denomination row. Thus, it will be seen, transfers can be made from the lowest to the highest denomination amount banks. Since these transfers occur after the differential slide has been positioned by the depressed key stem, it is obvious that these transfers can be made into the print key bank during the second portion of the movement of the differential slide back towards its home position, since the print key function also occurs during the positioning of the differential slide by a depressed key stem.

For a complete disclosure of the transfer mechanism, reference should be made to the previously cited U.S. Pat. No. 2,443,652.

Figure 5:
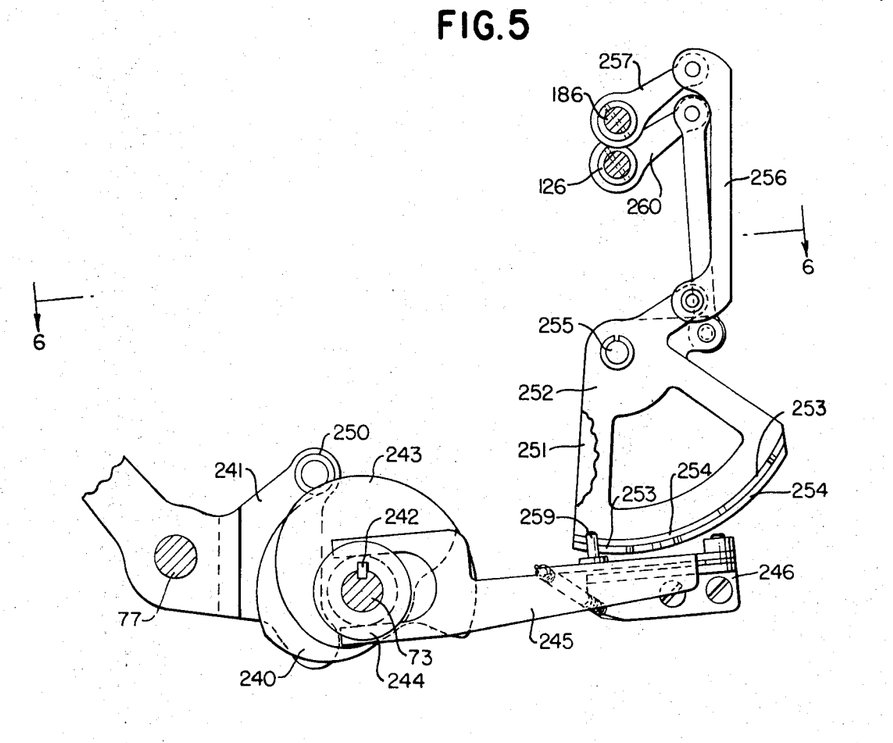
FIG. 5 is a side detailed view of the control mechanism for selectively positioning the sliding control cam against the fixed cam.
Figure 6:
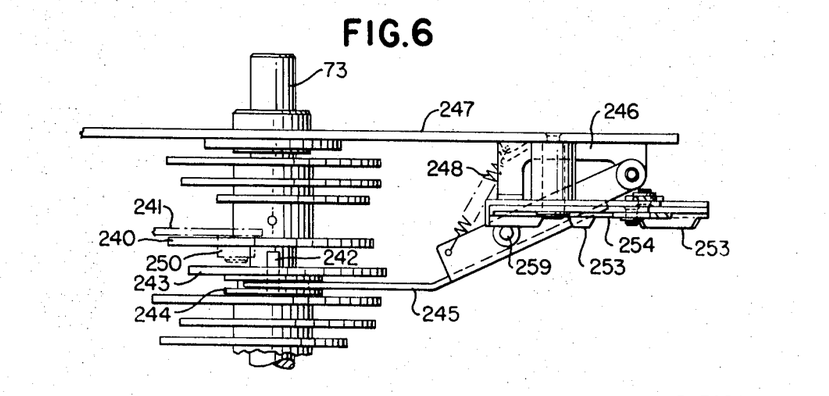
FIG. 6 is a top view, taken on the line 6–6 of FIG. 5, of the sliding cam control mechanism.

The present invention will now be described wherein the totalizer wheels of the print key banks may be utilized to accept transfers from the amount banks, thus enlarging the accumulating capacity of a machine without disrupting the functional operation of the print keys. Referring to FIGS. 5 and 6, there is shown a mechanism for selectively positioning a cam member to vary the timing of the movement of the amount actuators 55 in each of the print key banks to its home position. As described previously, the print keys function to control the indicators and the printing mechanism during the time the actuator 55 (FIG. 1) is being positioned by the depressed key. FIG. 3 discloses the timing of the amount differential drive arm cams 85, 86 (FIG. 1). As was described previously, the actuator 55 is operated between 90° and 180° of operation of the cam line. If the machine was performing a read or reset operation, the totalizer wheels would have been brought into engagement with the actuators between 80° and 100°, as indicated in FIG. 3. The totalizer wheels are withdrawn from the actuator between 180° and 200°. If an add operation is to occur, the counters are brought into engagement with the actuators between 220° and 240° prior to return movement of the actuators to their home position.

The totalizer wheels located in the print key banks are used as storage totals, accepting transfers from the highest order denomination amount bank during an add operation. Thus, referring to FIG. 2, both the print banks 27, 28 will accept transfers from the amount bank 26 in the manner described previously. Therefore the accumulating capacity of the cash register is seven digits rather than being limited to five digits, which is normal for a machine with five amount banks. Thus the totalizer wheels in the print key banks would be engaged with the actuators 55 of the print key banks between 80° and 200°, as indicated in FIG. 3, when the machine is operated in a read or reset mode, but the totalizer wheels must not be affected during the time they are engaged with the actuators 55 during an adding operation. This will prevent the keys in the print key banks from affecting the totals that are stored in the totalizer wheels. This is accomplished by returning the actuators 55 in the print key banks to their home position prior to the second engagement of the totalizer wheels with the actuators. FIG. 3 shows, by the dotted line, how the actuators are returned to their home positions by 220° of revolution of the cam shaft. Once the actuators are returned to the home position, subsequent engagement of the totalizer wheels with the actuators at 240° will not effect the amount set up in the totalizer wheels and will allow amounts to be transferred to the print key totalizer wheels from the amount banks in the manner described previously. These transfers occur any time during an add operation of the amount banks when the wide tooth on the totalizer wheels in the last amount bank trips the transfer pawl 228 (FIG. 10). The tooth portion 219 of the transfer segment 218 of the counter gear 212, which had been held by the foot portion 233 of the stop arm 224 against the action of the spring 222 away from the counter gear when the counter gear moved past the zero position to the home position, will be released to the action of the spring 222. This counterclockwise movement of the tooth portion 219 will engage the totalizer wheel 232 in the print key bank, rocking the totalizer clockwise to add "one" to the totalizer. Thus the totalizer in each of the print key banks will accept transfers only during the add operation of the machine.

As shown in FIGS. 5 and 6, secured to the main cam shaft 73 is a cam plate 240, which drives the cam arm 241 for both print key banks. Slidably mounted on the shaft 73 by means of a key 242 is a second cam plate 243. The cam plate 243 is secured to a hub 244, which is yoked by one end of a control yoke 245. The other end of the control yoke 245 is rotatably mounted to a bracket 246 secured to a side frame 247 of the machine. A spring 248, mounted between the yoke 245 and the bracket, normally urges the yoke clockwise, as viewed in FIG. 6. This movement of the yoke 245 slides the cam plate 243 along the key 242 to a position adjacent a roller 250, mounted on the cam arm 241, thus effectively changing the rotational movement of the cam arm. With the cam plate 243 controlling the cam arm 241, the actuators 55 (FIG. 1) in the print key banks will be returned to their zero position by 220° of revolution of the cam shaft 73, as shown in dotted lines in FIG. 3. This will allow the totalizer wheels in the print key banks to be utilized only in read or reset operations but not in an adding operation other than accepting transfers. Thus the accumulating capacity of the machine can include the totalizer wheels of the print key banks.

The control of operation of the yoke 245 is effected by a pair of selecting plates 251, 252, each of which has a number of high and low cam surfaces 253, 254, respectively, which cooperate with a stud 259 mounted on the control yoke 245 to reciprocate the control yoke to move the cam plate into and out of engagement with the roller 250 on the drive cam arm 241. The selecting plates are rotatably mounted on a shaft 255 supported within the framework of the machine. The selecting plate 252 rotatably supports a link 256, the other end of which engages a crank 257 secured to the shaft 186 (FIG. 1). The shaft 186 is controlled by the keys in the second transaction bank in the same manner as the shaft 98 and the crank 97 (FIG. 1) of the amount banks are controlled in the manner described previously. In the present example, whenever the transaction keys "Sub Total", "No Change", and "Change" are depressed (FIG. 2), the selecting plate 252 is rotated about the shaft 255 by the rotation of the shaft 186, so that a cam surface 253 of the plate will cam the stud 259 and the control yoke 245 counterclockwise, as viewed in FIG. 6, to move the cam plate 243 out of engagement with the drive arm roller 250. This will allow the totalizer wheels in the print key banks to engage the actuators prior to the movement of the actuators to the home position. This operation normally allows amounts which were read during the first portion of the actuator movement to be restored into the totalizer wheels. When any other transaction key in the second transaction key bank 21 (FIG. 2) is depressed, a low surface 254 of the selecting plate 252 positions the cam plate 243 adjacent the cam plate 240 to return the actuators to their home position, as shown by the dotted line in FIG. 3, prior to the movement of the totalizer wheels into engagement with the actuators. This normally occurs during the time between 220° and 240° of the operation of the cam shaft, as shown in FIG. 3. The totalizer wheels are not affected during this latter operation other than accepting transfers from the amount banks in the manner described previously.

A second selecting plate 251 is similarly controlled by a link 258 and a crank 260 secured to the shaft 126 (FIGS. 5 and 7), which is operated by the control slide 30 in the manner described previously. When the lock lever is shifted to the read or reset position (FIG. 7), the selecting plate 251 is rotated by the shaft 126 to position a high surface 253 against the stud 259 to move the cam plate 240 out of engagement with the drive arm roller 250, which allows the totalizer wheels in the print key banks to be operated in a read or reset machine operation. When the lock slide is in the add, or registering, position, a low surface 254 on the selecting plate 251 allows the cam plate 243 to engage the drive arm roller 250 to return the actuating member 55 to its zero position prior to the engagement of the totalizer wheels during the second half of the cam shaft revolution, as disclosed in FIG. 3. Thus it is seen that the totalizer wheels in the print key banks can be utilized in the accumulating capacity of the machine without interfering with the normal operation of the print key function.

We claim:

1. In a cash register adapted to perform a cycle of operation, said register having a keyboard which includes a plurality of first and second sets of banks of amount entry keys and a plurality of totalizer elements, the combination of:
   a. a differential actuator for each bank of amount entry keys;
   b. means, including a first cam member, for driving each of said differential actuators through a cycle of operation;
   c. means, when operated, for engaging and disengaging selected totalizer elements with and from each differential actuator during each cycle of operation, whereby amounts entered into the keyboard by depression of an amount key are transferred to the selected totalizer elements;
   d. control means for operating said engaging and disengaging means when moved to an actuated position;
   e. a second cam member slidably mounted adjacent said first cam member in said second set of amount entry banks;
   f. means engaging said second cam member for moving, when actuated, said second cam member to a position for driving the differential actuators of the second set of amount banks through a cycle of operation different from that of said first cam member, whereby amounts entered into the second set of amount banks are not transferred to the selected totalizer elements; and
   g. means interconnecting said engaging means and said control means whereby, upon movement of the control means to an actuated position, said engaging means is actuated, resulting in amounts being transferred to selected totalizer elements in the first set of amount banks only.

2. The cash register of claim 1 in which said driving means includes a shaft member, said first cam member being secured to the shaft member:
   said second cam member being slidably mounted on said shaft member adjacent said first cam member;
   said engaging means includes a movable yoke member engaging said second cam member; and
   said interconnecting means includes a third cam member engaging said yoke member, said third cam member being operated upon movement of said control means to said actuated position to move said yoke member, whereby said second cam member is positioned to drive the differential actuators of the second set of amount banks so that amounts are not transferred to the selected totalizer element in said banks.

3. The cash register of claim 2 in which said control means includes:
   a manually operated lever member slidably mounted for movement to a first position;
   a stop member mounted on said yoke member;
   resilient means engaging said yoke member and urging said yoke member in a direction whereby said stop member engages said third cam member; and
   said interconnecting means includes a link member interconnecting said lever member and said third cam member whereby, upon movement of said lever member to said first position, the third cam member is operated to move said yoke member.

4. The cash register of claim 1 in which said first cam member is adapted to drive the differential actuators through a cycle of operation during which the selected totalizer elements are engaged with the actuators to effect a transfer of amounts to the totalizer elements from the actuators while said second cam member, when moved to a driving position, is adapted to drive the differential actuators through a cycle of operation prior to the engagement of the selected totalizer elements with the actuators, whereby amounts entered into the second set of amount banks are not transferred to the selected totalizer elements.

5. In a cash register adapted to perform a cycle of operation, said register having a keyboard which includes a first and a second set of banks of amount entry keys and a plurality of totalizer elements, the combination of:
   a. a differential actuator for each bank of amount entry keys;
   b. means for driving each of said differential actuators through a first cycle of operation, said driving means including a first cam member;
   c. means, when operated, for engaging and disengaging selected totalizer elements with and from each differential actuator during said first cycle of operation in add, read, or reset timing, whereby amounts entered into the keyboard by depression of an amount key are transferred to selected totalizer elements;
   d. first control means for operating said engaging and disengaging means in add timing when moved to a first position and in read or reset timing when moved to a second position;
   e. second control means for operating said engaging and disengaging means in read or reset timing when operated;
   f. a second cam member slidably mounted adjacent said first cam member in said second set of amount entry banks;
   g. means engaging said second cam member for moving, when actuated, said second cam member to a position for driving the differential actuators of the second set of amount banks through a second cycle of operation, whereby amounts entered into the keyboard by depression of an amount key are not transferred to the selected totalizer elements; and
   h. means interconnecting said engaging means and said first and second control means whereby, upon movement of said first control means to said first position and said second control means is not operated, said engaging means is actuated, resulting in amounts being transferred to selected totalizer elements in the first set of amount banks only.

6. The cash register of claim 5 in which said second set of banks of amount entry keys includes:
   banks of print key members;
   said driving means includes a shaft member, said first cam member being secured to the shaft member;
   said second cam member being slidably mounted on said shaft member adjacent said first cam member;
   said engaging means includes a movable yoke member engaging said second cam member; and
   said interconnecting means includes a third cam member operated by said first control means, said third cam member engaging said yoke member, and a fourth cam member operated by said second control means, said fourth cam member engaging said yoke member whereby, upon movement of said first control means to said first position and said second control means is not operated, said third and fourth cam members are positioned to move said yoke member and said second cam member to disable amounts from being transferred to the selected totalizer elements in the print key banks.

7. The cash register of claim 6 in which:
said first control means includes a manually-operated lever member slidably mounted for movement to said first and second positions;
said second control means includes:
   a plurality of depressible transaction keys;
   a stop member mounted on said yoke member;
   resilient means engaging said yoke member and normally urging said yoke member in a direction whereby said stop member engages said third and fourth cam members; and
said interconnecting means includes link members engaging said third and fourth cam members and operated by said lever member and said transaction keys, whereby, upon movement of said lever member to said first position and with any of said transaction keys not being depressed, the third and fourth cam members are positioned to move said yoke member and said second cam member to a position to disable the transferring of amounts in said print key banks.

8. The cash register of claim 7 in which said third and fourth cam members each has a first and second control surface, said cams positioning said first control surface against said stop member when the lever member is moved to said first position and any of the transaction keys are not depressed, said cams positioning said second control surface against said stop member when the lever member is moved to said second position and any of said transaction keys are depressed, whereby amounts are not transferred in said print key banks only when the lever member is in said first position and none of said transaction keys are depressed.